US012681639B2

(12) United States Patent
Liu et al.

(10) Patent No.: US 12,681,639 B2
(45) Date of Patent: Jul. 14, 2026

(54) SELF-MANAGED DRAM MODULES WITH BUILT-IN DATA COMPRESSION AND TIERED CACHING

(71) Applicant: ScaleFlux, Inc., Milpitas, CA (US)

(72) Inventors: Yang Liu, Milpitas, CA (US); Fei Sun, Irvine, CA (US); Tong Zhang, Albany, NY (US)

(73) Assignee: SCALEFLUX, INC., Milpitas, CA (US)

( * ) Notice: Subject to any disclaimer, the term of this patent is extended or adjusted under 35 U.S.C. 154(b) by 0 days.

(21) Appl. No.: 18/937,289

(22) Filed: Nov. 5, 2024

(65) Prior Publication Data

US 2026/0126910 A1    May 7, 2026

(51) Int. Cl.
*G06F 3/06* (2006.01)
*G06F 12/0811* (2016.01)

(52) U.S. Cl.
CPC .......... *G06F 3/0608* (2013.01); *G06F 3/0659* (2013.01); *G06F 3/0673* (2013.01); *G06F 12/0811* (2013.01)

(58) Field of Classification Search
CPC .... G06F 3/0608; G06F 3/0673; G06F 3/0659; G06F 12/0811
USPC ................................................. 711/105, 113
See application file for complete search history.

(56) References Cited

U.S. PATENT DOCUMENTS

| | | | |
|---|---|---|---|
| 2004/0250009 A1* | 12/2004 | Chen ..................... | G06F 3/0608 |
| | | | 711/E12.008 |
| 2011/0040906 A1* | 2/2011 | Chung .................. | G06F 12/121 |
| | | | 711/E12.001 |
| 2019/0243780 A1* | 8/2019 | Gopal ................. | G06F 12/0811 |
| 2022/0237112 A1* | 7/2022 | Martin ............... | G06F 12/1063 |
| 2024/0078186 A1* | 3/2024 | Uhrenholt ............ | G06F 12/123 |
| 2025/0238374 A1* | 7/2025 | Persson .............. | G06F 12/0815 |

* cited by examiner

*Primary Examiner* — Hashem Farrokh
(74) *Attorney, Agent, or Firm* — Hoffman Warnick LLC

(57) ABSTRACT

A self-managed DRAM module and method. A controller chip is configured to handle data access requests according to a process that includes: searching a first tier for an uncompressed cache data block; in response to a first tier hit, serving the uncompressed cache data block to service the data access request; in response to a first tier miss, searching a second tier for a compressed cache data block; in response to a second tier hit, decompressing the compressed cache data block to generate a decompressed cache data block, and inserting the decompressed cache data block into the first tier to service the data access request; and in response to a second tier miss, reading a compressed data block from DRAM, decompressing the compressed data block to generate a decompressed data block, and inserting the decompressed data block into the first tier to service the data access request.

20 Claims, 11 Drawing Sheets

FIG. 2

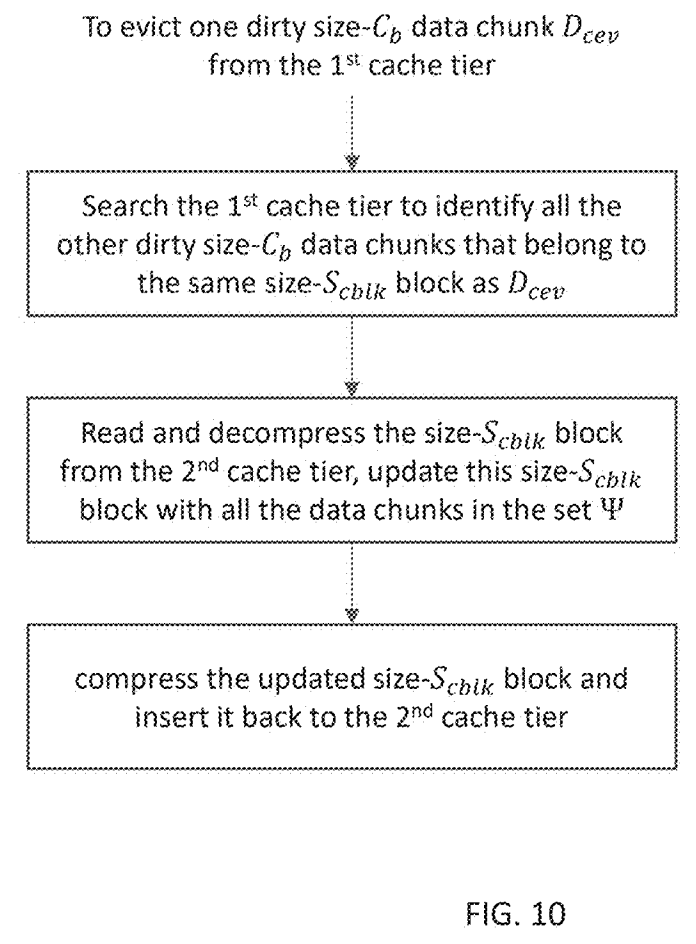

To evict one dirty size-$C_b$ data chunk $D_{cev}$ from the 1st cache tier

Search the 1st cache tier to identify all the other dirty size-$C_b$ data chunks that belong to the same size-$S_{cblk}$ block as $D_{cev}$ Read and decompress the size-$S_{cblk}$ block from the 2nd cache tier, update this size-$S_{cblk}$ block with all the data chunks in the set Ψ compress the updated size-$S_{cblk}$ block and insert it back to the 2nd cache tier

FIG. 10

SELF-MANAGED DRAM MODULES WITH BUILT-IN DATA COMPRESSION AND TIERED CACHING

TECHNICAL FIELD

The present invention relates to the field of solid-state memory, and particularly to improving the cost/energy efficiency of DRAM (dynamic random-access memory) modules by utilizing tiered caching.

BACKGROUND

Modern computers use DRAM (dynamic random-access memory) chips to implement memory systems. In conventional practice, each CPU (central processing unit) chip connects to its exclusively owned/controlled DRAM modules, typically in the form of DIMM (dual in-line memory module), through dedicated DDR (double data rate) channels. Each CPU chip incorporates one or multiple DRAM controllers, and each DRAM controller is responsible for controlling all the DRAM chips on one DDR channel. As a result, the number of DRAM controllers inside a CPU chip determines the maximum DRAM capacity and bandwidth that are directly available to the CPU. Due to the high implementation complexity of DRAM controllers and hardware resources (e.g., the CPU chip pins) consumed by each DDR channel, modern CPUs can only integrate a relatively small number (e.g., 8 or 12) of DRAM controllers, leading to a limited DRAM capacity and bandwidth that are directly available to the CPU. Meanwhile, it is very difficult for a group of CPUs to share/pool their DRAM resources to improve the overall memory utilization efficiency.

To facilitate the DRAM capacity/bandwidth expansion and pooling/sharing, the computing industry has developed open standards, in particular CXL (compute express link), that allow CPU-memory connections over high-speed PCIe (Peripheral Component Interconnect Express) links. In this context, much of DRAM control/management functionalities are migrated from CPUs into the DRAM modules, leading to self-managed DRAM modules in contrast to the conventional CPU-managed DRAM modules. Because modern CPUs could communicate with other devices through many PCIe lanes/channels, CPUs could connect to many self-managed DRAM modules (e.g., CXL-based DRAM modules) to expand their memory capacity/bandwidth. Moreover, unlike conventional CPU-managed DRAM modules, one self-managed DRAM module can directly connect to multiple CPUs. Hence a self-managed DRAM module could be easily shared among multiple CPUs, which allows multiple CPUs to pool memory resources together to improve the overall memory utilization efficiency.

SUMMARY

Accordingly, an embodiment of the present disclosure is directed to methods for improving the utilization efficiency of on-chip cache memory in self-managed DRAM modules.

A first aspect provides a self-managed dynamic random-access memory (DRAM) module, comprising: a plurality of DRAM; and a controller chip having a cache with a first tier configured for storing uncompressed data and a second tier configured for storing compressed data, wherein the controller chip is configured to handle data access requests according to a process that includes: searching the first tier for an uncompressed cache data block to service the data access request; in response to a first tier hit, serving the uncompressed cache data block to service the data access request; in response to a first tier miss, searching the second tier for a compressed cache data block to service the data access request; in response to a second tier hit, decompressing the compressed cache data block to generate a decompressed cache data block, and inserting the decompressed cache data block into the first tier to service the data access request; and in response to a second tier miss, reading a compressed data block from DRAM, decompressing the compressed data block to generate a decompressed data block, and inserting the decompressed data block into the first tier to service the data access request.

A second aspect provides a method of handling data access requests with a self-managed dynamic random-access memory (DRAM) module, comprising: providing a plurality of DRAM; providing a controller chip having a cache with a first tier configured for storing uncompressed data and a second tier configured for storing compressed data; searching the first tier for an uncompressed cache data block to service the data access request; in response to a first tier hit, serving the uncompressed cache data block to service the data access request; in response to a first tier miss, searching the second tier for a compressed cache data block to service the data access request; in response to a second tier hit, decompressing the compressed cache data block to generate a decompressed cache data block, and inserting the decompressed cache data block into the first tier to service the data access request; and in response to a second tier miss, reading a compressed data block from DRAM, decompressing the compressed data block to generate a decompressed data block, and inserting the decompressed data block into the first tier to service the data access request.

BRIEF DESCRIPTION OF THE DRAWINGS

The numerous advantages of the present invention may be better understood by those skilled in the art by reference to the accompanying figures in which:

FIG. 2 illustrates the architecture of a self-managed DRAM module that supports data compression according to embodiments.

FIG. 10 illustrates the flow diagram of evicting a dirty cache block from the 1$^{st}$ cache tier to the 2$^{nd}$ cache tier in the generalized two-tier cache for self-managed DRAM modules with built-in compression according to embodiments.

Figure 1:
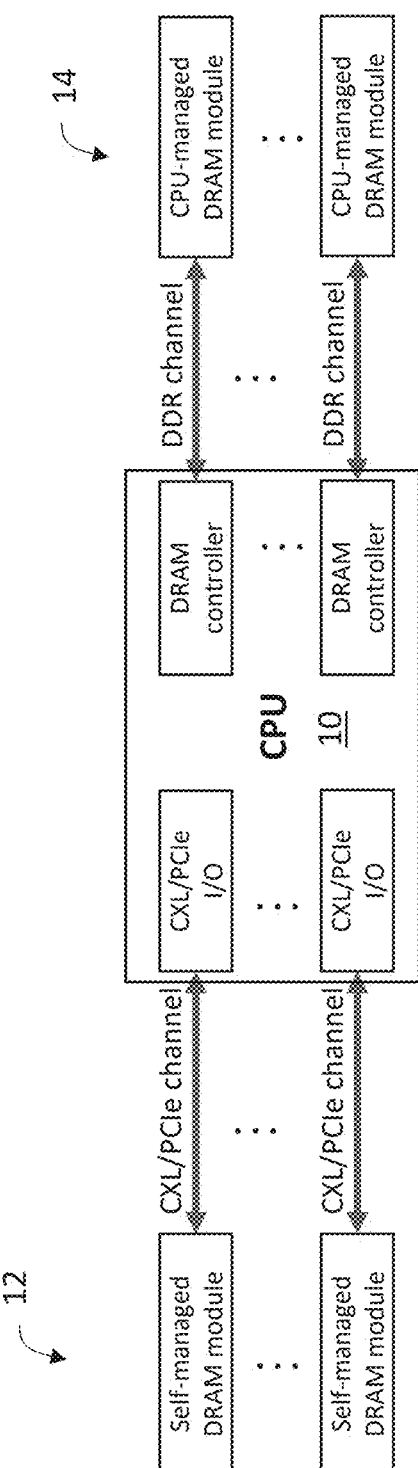
FIG. 1 illustrates a CPU connecting to both CPU-managed DRAM modules through DDR channel and self-managed DRAM modules through CXL/PCIe channel according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Self-managed DRAM modules make it possible to deploy lossless data compression to expand the usable memory capacity at zero cost overhead. The controller chip inside self-managed DRAM modules is responsible for data compression/decompression, being transparent to host CPUs. To achieve a high compression ratio, lossless data compression is often performed in the unit of large block sizes (e.g., 1 KB, 2 KB, or 4 KB). Nevertheless, host processors typically access self-managed DRAM modules in a fine granularity (e.g., 64 B). Such significant size mismatch inevitably causes DRAM read/write amplification and hence degrades speed performance. In the current approach, to mitigate the speed performance degradation, the controller chip integrates on-chip cache using memory technologies such as SRAM (static random-access memory). Aspects described herein improve the utilization efficiency of on-chip cache memory.

FIG. 1 illustrates a CPU (also referred to herein as host, host processors, or CPU chip) 10 connected with both CPU-managed DRAM modules 14 through DDR channels and self-managed DRAM modules 12 through CXL/PCIe channels. All the DRAM modules 14 on one DDR channel are fully controlled/managed by one DRAM controller inside the CPU chip 10. Using an integrated CXL/PCIe I/O engine (that is much simpler than a DRAM controller), the CPU connects to one self-managed DRAM module 12 through a CLX/PCIe channel. Each self-managed DRAM module 12 internally controls/manages the DRAM chips on its own and serves requests (e.g., data read and write) from host processors through the CXL/PCIe channel.

Figure 2:
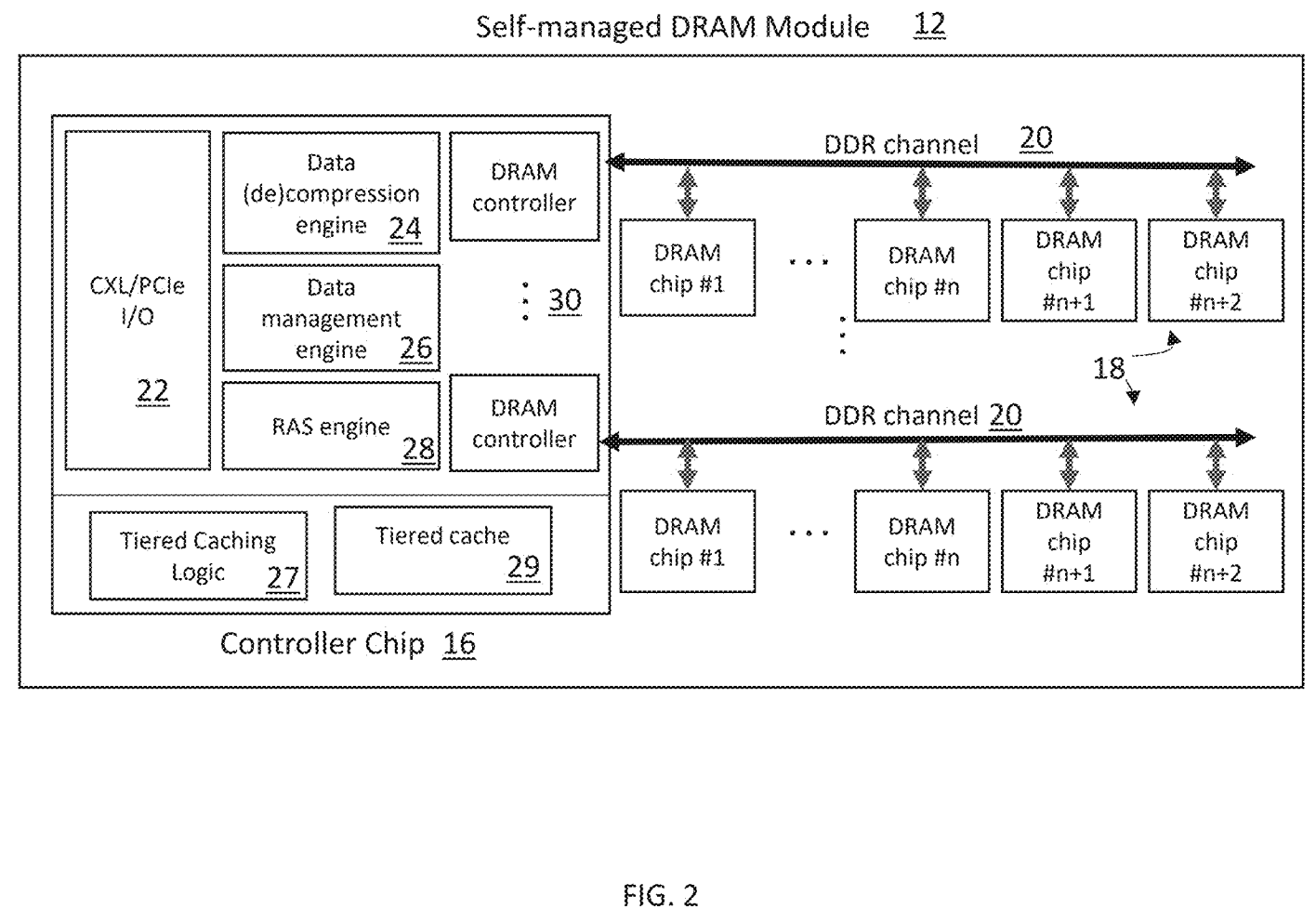

FIG. 2 illustrates the architecture of a self-managed DRAM module 12 that performs internal data compression, which makes it possible to deploy lossless data compression to expand the usable memory capacity at zero cost overhead. By reducing the data in-memory footprint, lossless data compression can reduce the effective memory bit cost. Self-managed DRAM module 12 can internally implement data compression, transparent to host processors. Since in-memory data tend to have high compressibility (e.g., compression ratio of 2:1 and above), such compression-capable self-managed DRAM modules can achieve significant memory cost reduction.

As shown, self-managed DRAM module 12 contains a controller chip 16 and multiple DRAM chips 18. The controller chip 16 inside self-managed DRAM module 12 is responsible for data compression/decompression, being transparent to host CPUs 10. All the DRAM chips 18 are organized into multiple DDR channels 20, where each channel contains n+2 DRAM chips (n=8 when using latest DDR5 DRAM chips). As illustrated in FIG. 2, the controller chip 16 contains (i) a CXL/PCIe I/O engine 22 to communicate with host processors, (ii) multiple DRAM controllers 30, each one controls all the n+2 DRAM chips on one DDR channel, (iii) data compression and decompression engine 24 that performs data compression and decompression, (iv) data management engine 26 that manages the storage of compressed data blocks on DRAM chips, and (v) RAS (reliability, availability, and serviceability) engine 28 that is responsible for the reliability, availability, and serviceability of the entire self-managed DRAM module 12. To ensure the data storage reliability, the RAS engine 28 protects data with an ECC (error correction code), where ECC coding redundancy should cover two DRAM chips on each channel to tolerate a catastrophic failure of one DRAM chip. Therefore, among the total n+2 DRAM chips on each DDR channel, n chips store user data and 2 chips store ECC coding redundancy. Controller chip 16 also includes a tiered caching logic 27 and tiered cache 29 having a first tier and a second tier, which assist in performing aspects of the described embodiments.

Host processors (i.e., CPU 10) access self-managed DRAM modules in the unit of cachelines and let $S_{cache}$ denote the number of bytes in each cacheline. Most CPUs set the cacheline size as 64 B (i.e., $S_{cache}$=64). Since data compression ratio tends to improve as the compression block size increases, self-managed DRAM modules typically perform data compression in the unit of relatively large block sizes (e.g., 1 KB, 2 KB, or 4 KB) to achieve high compression ratio (e.g., 2:1 and above). As noted, host processors access self-managed DRAM modules in the use of cachelines with the typical size of 64 B. The cacheline size versus compression block size mismatch (e.g., 64 B versus 4 KB) inevitably causes significant DRAM read/write amplification inside self-managed DRAM modules. For example, let $S_{blk}$ denote the number of bytes of each compression block (e.g., 1 KB, 2 KB, or 4 KB). To serve a cacheline read (or write) request from host processors, self-managed DRAM modules must internally read/decompress (or read/decompress/modify/compress) an $S_{blk}$-byte data block from DRAM chips, leading to read/write amplification of $$\frac{S_{blk}}{S_{cache}}.$$

For example, given 64-byte cachelines and 4 KB compression blocks, the internal DRAM read/write amplification is $$\frac{S_{blk}}{S_{cache}} = \frac{4K}{64} = 64.$$

Such a high internal read/write amplification will significantly degrade the DRAM data access bandwidth utilization efficiency and hence degrade the speed performance of self-managed DRAM modules on serving read/write requests from host processors.

To mitigate such speed performance degradation, controller chip 16 integrates on-chip cache using memory technologies such as SRAM (static random-access memory). To implement such on-chip cache, one common practice is to employ set-associative cache architecture that has been used in modern CPUs.

Figure 3:
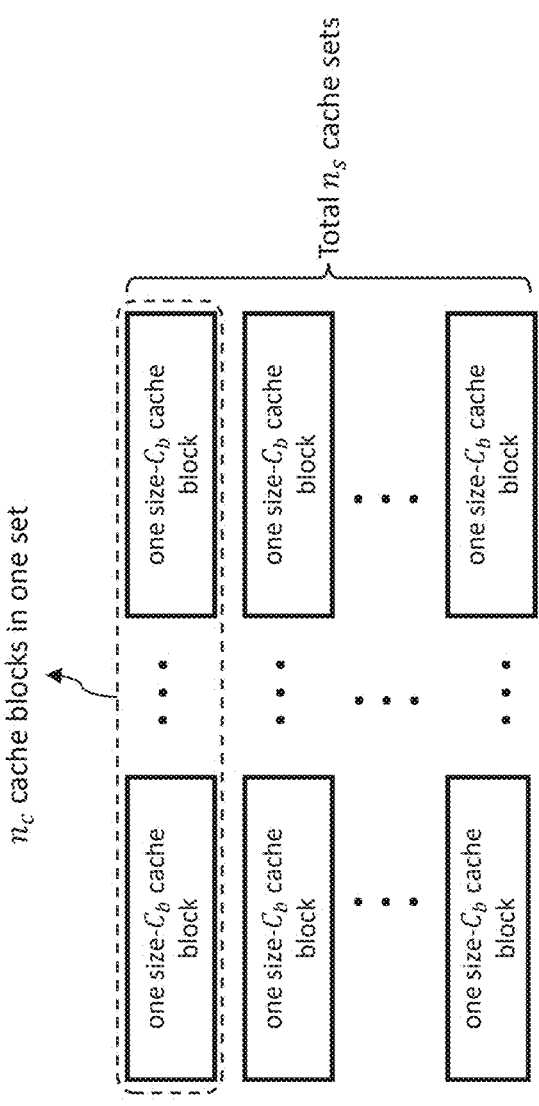
FIG. 3 illustrates the set-associative cache architecture according to embodiments.

An example of this architecture is illustrated in FIG. 3, where the entire cache is divided into many equal-size sets, each set consists of multiple equal-size cache blocks. Let $C_b$ denote the size of each cache block, $n_c$ denote the number of cache blocks per set, and $n_s$ denote the total number of sets in the cache. Hence the total cache capacity is $n_s \cdot n_c \cdot C_b$. Let $L_{DRAM}$ denote the logical DRAM address space exposed by the self-managed DRAM modules to the host 10. Chip 16 uses a hash function $f_h$ to map each logical DRAM address $A_r \in L_{DRAM}$ onto one unique cache set, i.e., $f_h(A_r) \in [1, n_s]$. Within the set, the address $A_r$ can be mapped to any one of the $n_c$ cache blocks. Upon a read/write access at the DRAM address $A_r$, the cache first determines the unique set that could possibly contain the requested data, and then searches among all the $n_c$ cache blocks in the set to check whether there is an address match. If a match is found, it results in a cache hit, allowing data to be accessed directly from the cache. If no match is found, indicating a cache miss, a replacement policy such as Least Recently Used (LRU) is employed to decide which cache block within the set will be replaced with the new data fetched from the DRAM chips. Set-associative caches are commonly used in modern processors due to their optimal balance of speed, efficiency, and complexity, enhancing overall system performance by managing and optimizing memory access patterns effectively.

Figure 4:
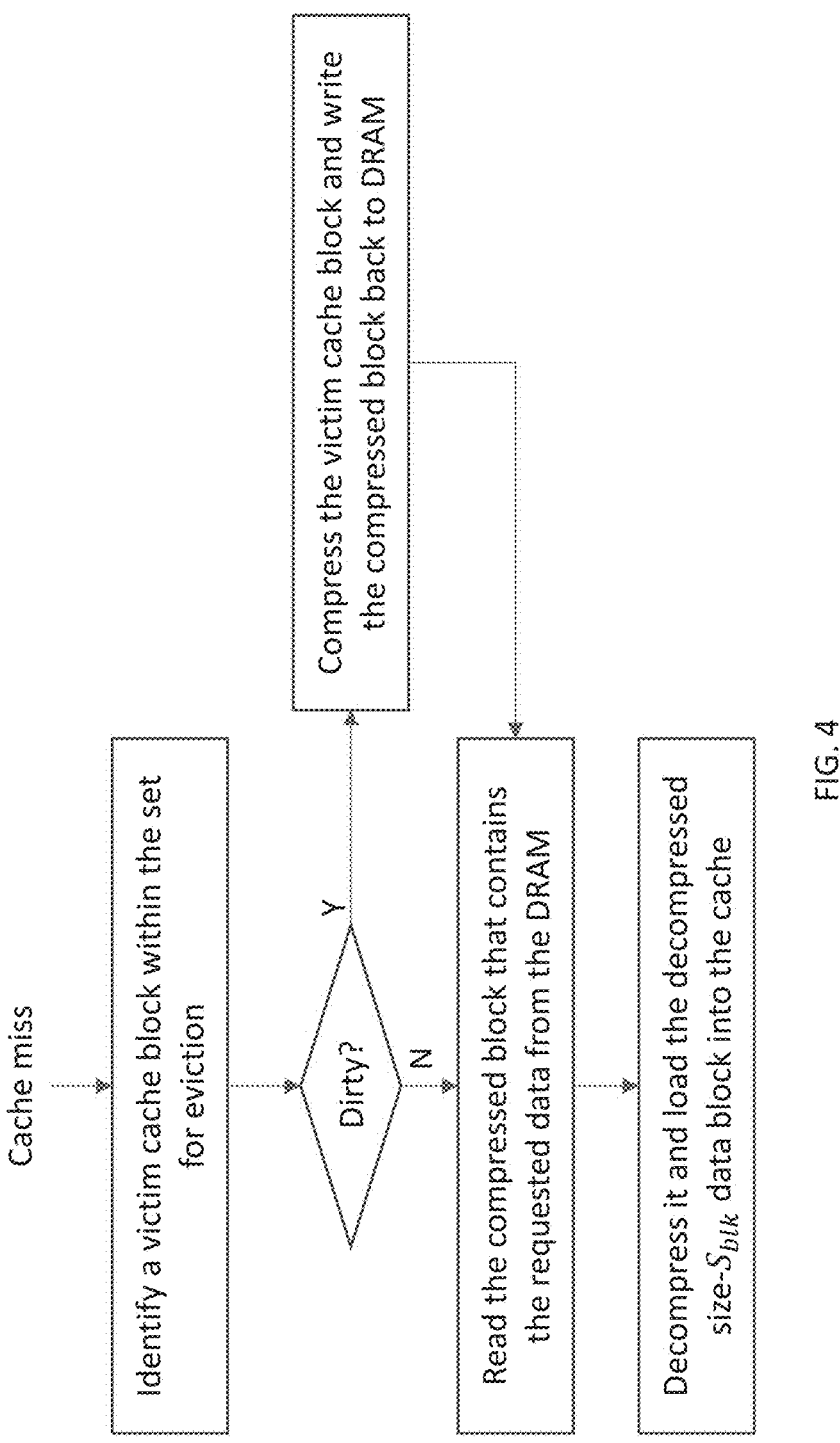
FIG. 4 illustrates the flow diagram of handling cache miss when using the conventional cache design practice according to embodiments.

Recall that self-managed DRAM module 12 internally performs compression on $S_{blk}$-byte data blocks. Hence, to simplify the implementation and meanwhile exploit the access spatial locality, chip 16 may set $C_b = S_{blk}$, i.e., the size of cache block equals to the compression block size. When using such a conventional cache design practice, as illustrated in FIG. 4, in case of a cache miss for the request at the address $A_r$, cache first identifies a victim cache block within the set for eviction (i.e., evict the victim cache block from the cache). If the victim cache block is dirty (i.e., it has been modified since it is read from DRAM), chip 16 directly compresses the victim cache block (since $C_b = S_{blk}$) and writes the compressed block back to DRAM. Then chip 16 reads the compressed block that contains the requested data from the DRAM, decompresses it, and loads the decompressed size-$S_{blk}$ data block into the cache space left by the evicted cache block. Finally, the cache can serve the read/write request.

Figure 5:
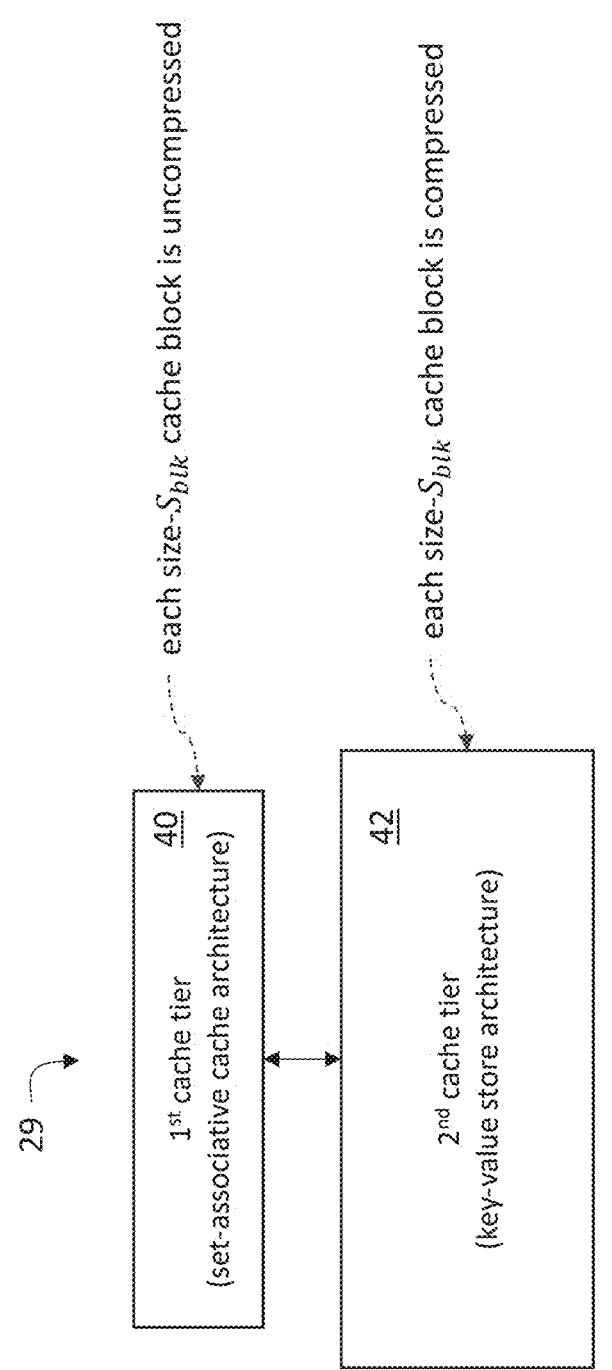
FIG. 5 illustrates the architecture of invented two-tier cache for self-managed DRAM modules with built-in compression according to embodiments.

The present approach improves the cache utilization efficiency for self-managed DRAM modules with built-in data compression. The illustrative techniques provide compression-enabled tiered caching and are implemented by chip 16 with tiered caching logic 27 and a tiered cache 29 (FIG. 1). As illustrated in FIG. 5, the controller chip 16 contains a two-tier cache 29: (1) The first ($1^{st}$) cache tier 40 uses the conventional set-associative cache architecture, where each size-$S_{blk}$ cache block is uncompressed; (2) the second ($2^{nd}$) cache tier 42 keeps each cache block in its compressed form and manages all the compressed cache blocks using a key-value store architecture. Chip 16 stores key-values pairs, and each key-value pair includes a key, which is the logical DRAM address of a compressed data block, and a value, which is a location of the compressed data block in the $2^{nd}$ tier cache. The second cache tier 42 leverages the existing high-speed (de)compression engine 24 inside the controller chip 16.

Figure 6:
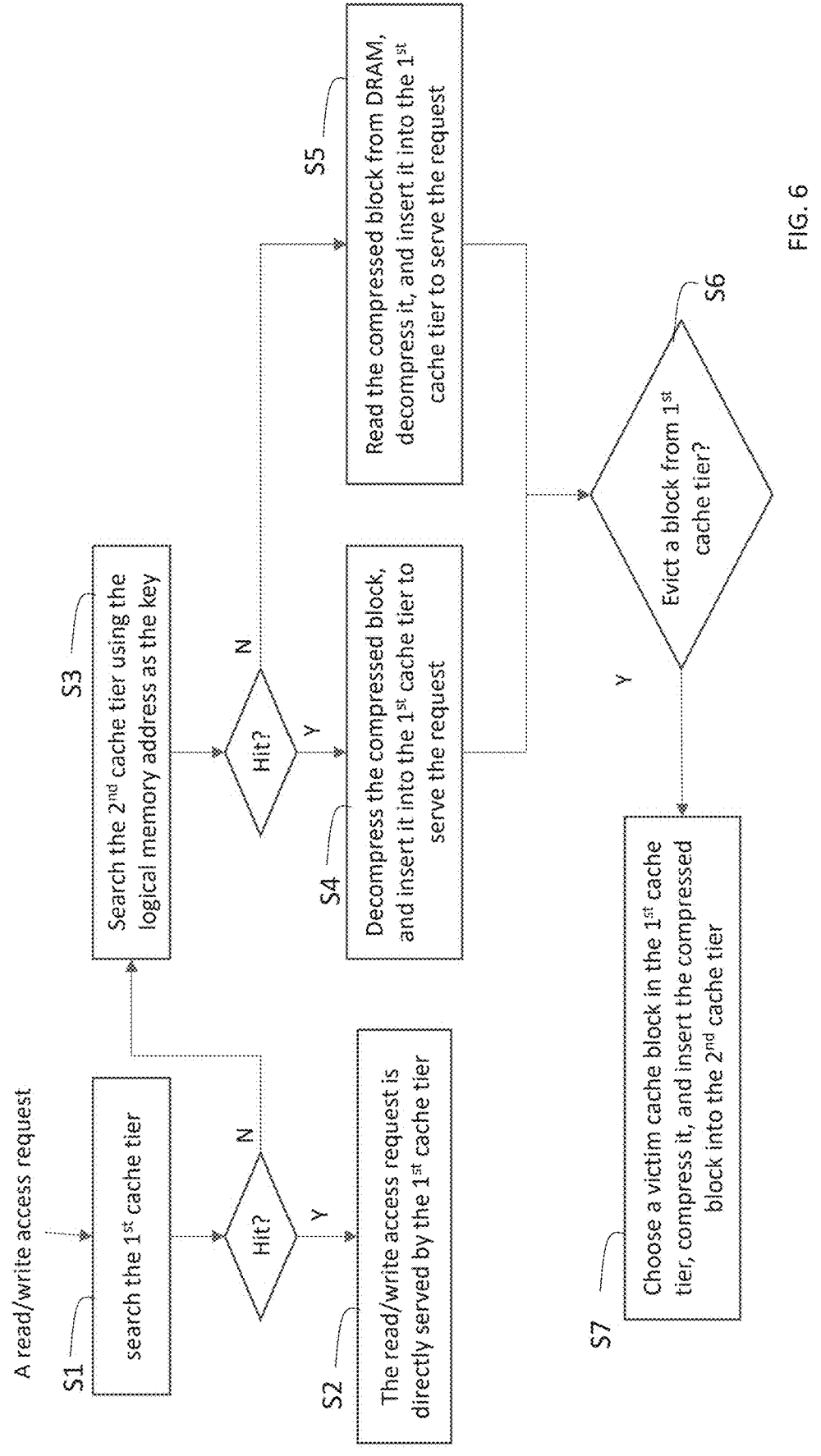
FIG. 6 illustrates the operational flow diagram of the invented two-tier cache serving a read/write request, where both cache tiers use the same cache block size as the DRAM compression block size according to embodiments.

FIG. 6 depicts an illustrative embodiment of tiered caching logic 27 for handling read/write access requests. Chip 16 will first search the $1^{st}$ cache tier 40 with the set-associative architecture at S1. In case of a hit, the read/write access request will be directly served by the $1^{st}$ cache tier. In case of a miss, chip 16 searches the $2^{nd}$ cache tier using the logical memory address as the key at S2.

In case of a hit (i.e., the $2^{nd}$ cache tier has the compressed block that contains the requested data), chip 16 will decompress the compressed block, and insert the decompressed block into the $1^{st}$ cache tier to serve the request at S4. A determination is also made at S6 whether the $1^{st}$ cache tier is full, and whether a cache block needs to be evicted from the $1^{st}$ cache tier prior to inserting the decompressed block into the $1^{st}$ cache tier. If so, then chip 16 will choose a victim cache block in the $1^{st}$ cache tier, compress it, and insert the compressed block into the $2^{nd}$ cache tier at S7.

In case of a miss at S3 (i.e., the $2^{nd}$ cache tier does not have the compressed block that contains the requested data), chip 16 will read the compressed block from DRAM at S5, decompress it, and insert the decompressed block into the $1^{st}$ cache tier to serve the request. A determination is also made at S6 whether the $1^{st}$ cache tier is full, and an existing cache block needs to be evicted from the $1^{st}$ cache tier prior to inserting the decompressed block into the $1^{st}$ cache tier. If so, then chip 16 will choose a victim cache block in the $1^{st}$ cache tier, compress it, and insert the resulting compressed block into the $2^{nd}$ cache tier at S7.

Figure 7:
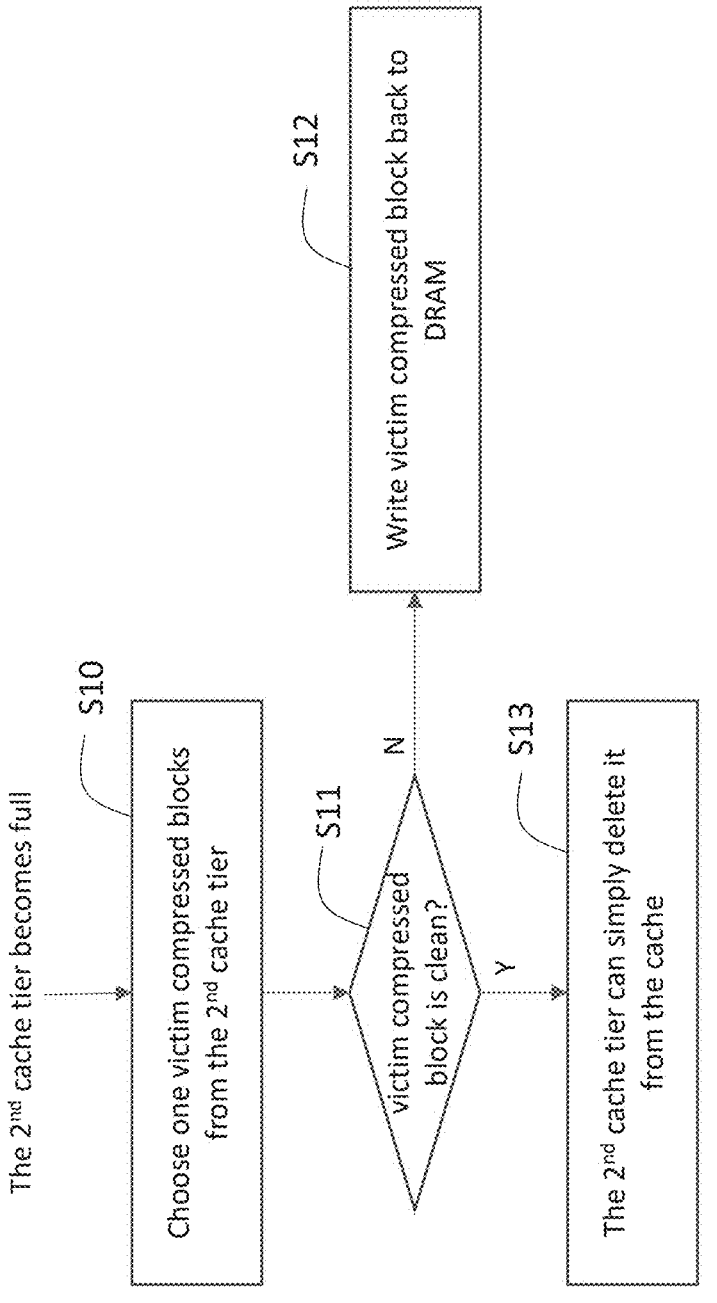
FIG. 7 illustrates the operational flow diagram of the invented two-tier cache evicting a compressed block from the $2^{nd}$ cache tier to DRAM according to embodiments.

FIG. 7 depicts the process flow when the $2^{nd}$ cache tier becomes full. At S10 the chip 16 choose one victim compressed block from the $2^{nd}$ cache tier to evict. If the victim compressed block is clean at S11 (i.e., it has not been modified since it was loaded from DRAM), the $2^{nd}$ cache tier can simply delete the chosen block from the cache at S13. If the victim compressed block is dirty at S11 (i.e., it has been modified since it was loaded from DRAM), chip 16 writes the block back to DRAM at S12.

Figure 8:
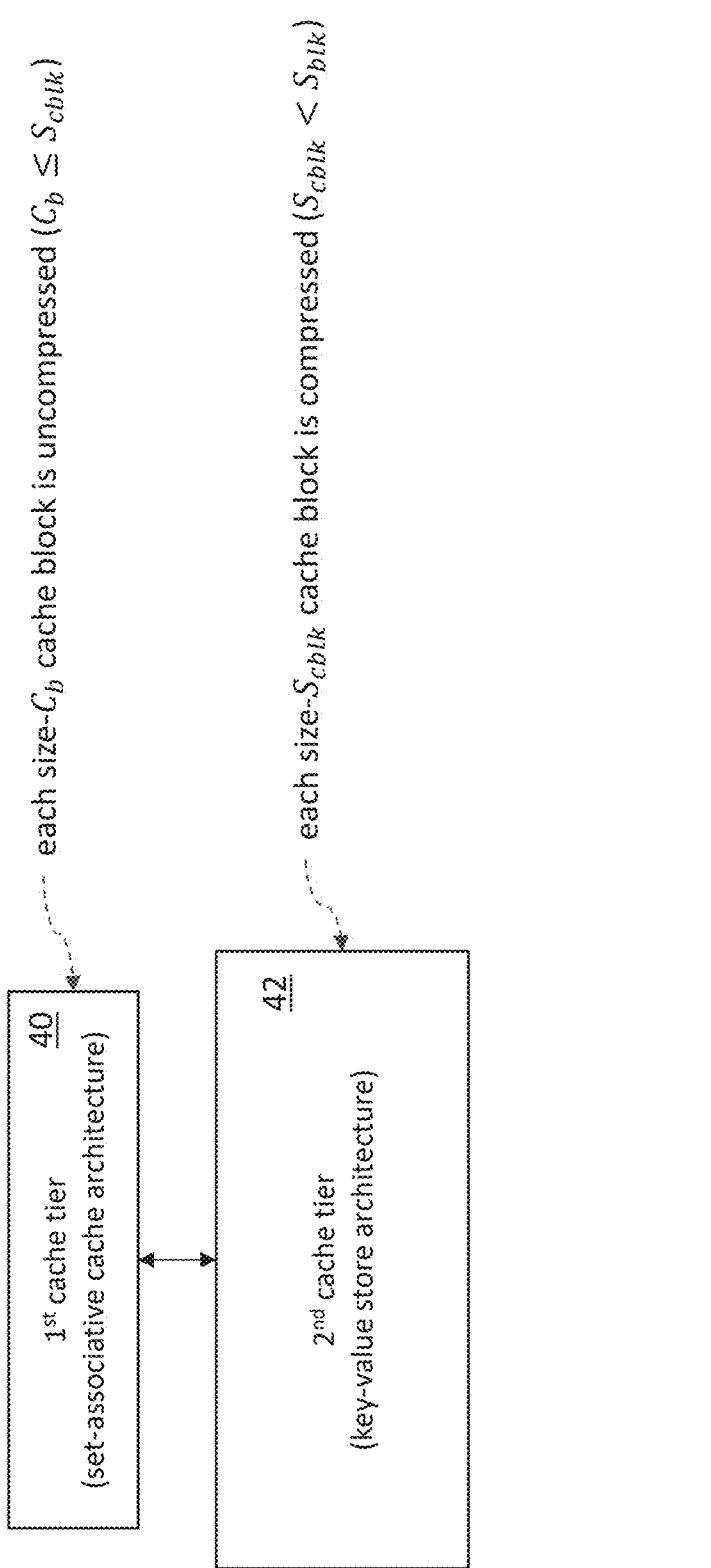
FIG. 8 illustrates the generalized two-tier cache for self-managed DRAM modules with built-in compression, where different cache tiers can use different cache block sizes that are different from the DRAM compression block size according to embodiments.

This proposed tiered caching system can be further extended as illustrated in FIG. 8. While in the above embodiments, the cache data block size is for example equal to the DRAM compressed block, i.e., $C_b = S_{blk}$, FIGS. 8-11 describe a different approach. For the $1^{st}$ cache tier 40, chip 16 can set its cache block size (much) smaller than the DRAM compression block size (i.e., $C_b < S_{blk}$), instead of $C_b = S_{blk}$. For the $2^{nd}$ cache tier 42, chip 16 could set the compression block size (denoted as $S_{cblk}$) smaller than the DRAM compression block size but equal or larger than the $1^{st}$ cache tier block size (i.e., $C_b \leq S_{cblk} < S_{blk}$). The $1^{st}$ cache tier 40 still maintains the same set-associative architecture, and the $2^{nd}$ cache tier still operates as a key-value store.

Figure 9:
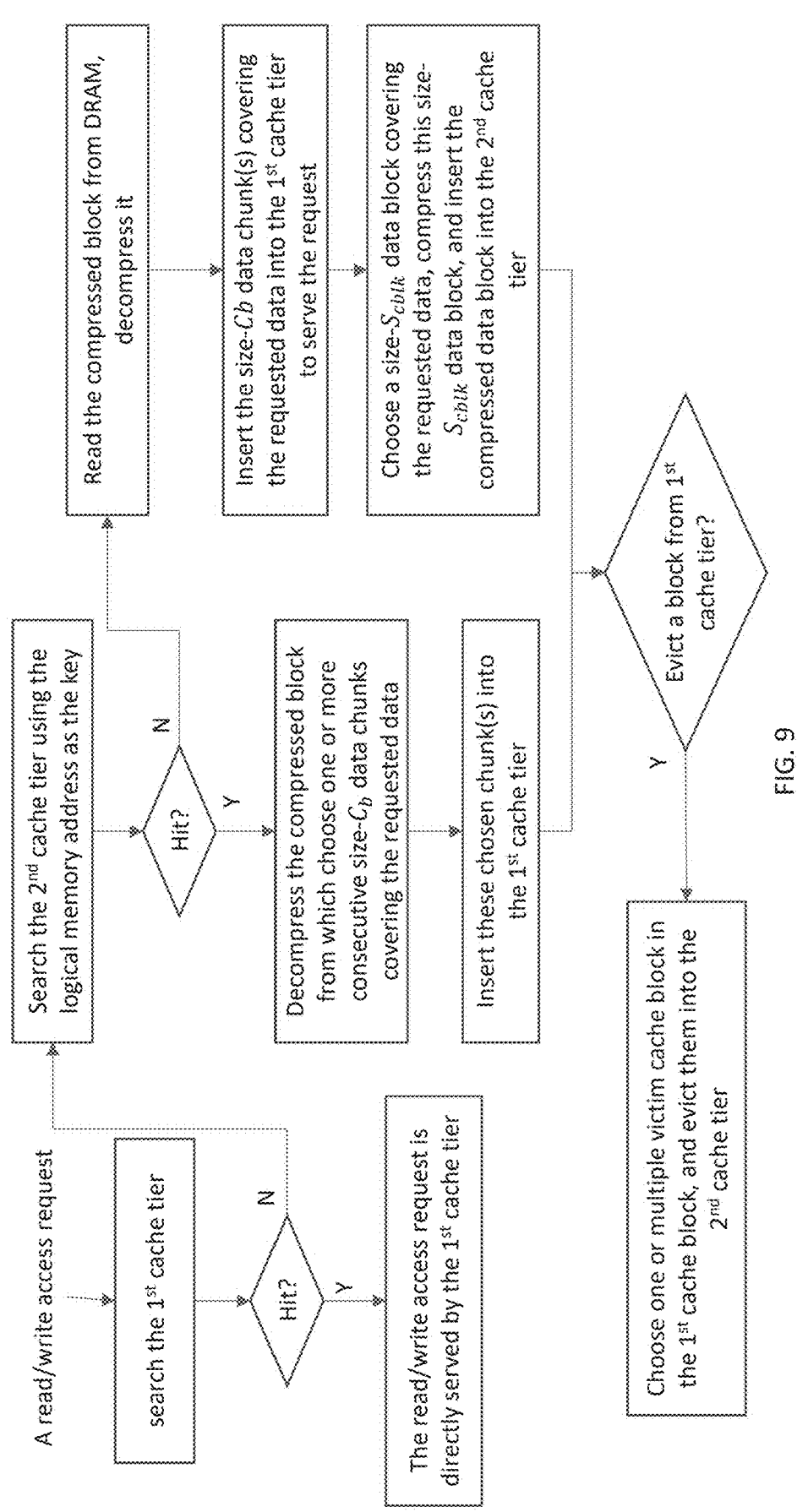
FIG. 9 illustrates the flow diagram of the generalized two-tier cache for self-managed DRAM modules with built-in compression, where different cache tiers can use different cache block sizes that are different from the DRAM compression block size according to embodiments.

Upon a read/write access request, as illustrated in FIG. 9, chip 16 will first search the $1^{st}$ cache tier with the set-associative architecture. In case of a hit, the read/write access request will be directly served by the $1^{st}$ cache tier 40. In case of a miss, chip 16 searches the $2^{nd}$ cache tier 42 using the logical memory address as the key.

In case of a hit (i.e., the $2^{nd}$ cache tier has the compressed block that contains the requested data), chip 16 will decompress the compressed block in a plurality of decompressed data chunks from which it chooses a subset of (e.g., one or multiple) consecutive size-$C_b$ data chunks covering the requested data, and inserts these chosen chunks into the $1^{st}$ cache tier to service the request. If chip 16 needs to evict one or multiple cache blocks from the $1^{st}$ cache tier before inserting these size-$C_b$ data chunks into the $1^{st}$ cache tier, then it will choose victim cache blocks in the $1^{st}$ cache block and evict them into the $2^{nd}$ cache tier.

In case of a miss (i.e., the $2^{nd}$ cache tier does not have the compressed block that contains the requested data), chip 16 will read the compressed block from DRAM and decompress it. From the decompressed size-$S_{blk}$ data block, chip 16 inserts the size-$C_b$ data chunk(s) covering the requested data into the $1^{st}$ cache tier 40 to serve the request. Chip 16 also chooses a size-$S_{cblk}$ data block covering the requested data, compresses this size-$S_{cblk}$ data block, and inserts the compressed data block into the $2^{nd}$ cache tier. If chip 16 needs to evict a cache block from the $1^{st}$ cache tier 40 before inserting the new size-$C_b$ data chunk into the $1^{st}$ cache tier, then it will choose victim cache blocks in the $1^{st}$ cache block and evict them into the $2^{nd}$ cache tier 42.

As illustrated in FIG. 10, when chip 16 needs to evict one dirty size-$C_b$ data chunk $D_{cev}$ from the $1^{st}$ cache tier, it searches the $1^{st}$ cache tier 40 to identify all the other dirty size-$C_b$ data chunks that belong to the same size-$S_{cblk}$ block as $D_{cev}$. Let $\Psi$ denotes the set that contains these dirty size-$C_b$ data chunks. Chip 16 will read and decompress the size-$S_{cblk}$ block from the $2^{nd}$ cache tier 42, update this size-$S_{cblk}$ block with all the data chunks in the set $\Psi$, and compress the updated size-$S_{cblk}$ block and insert it back to the $2^{nd}$ cache tier 42.

Figure 11:
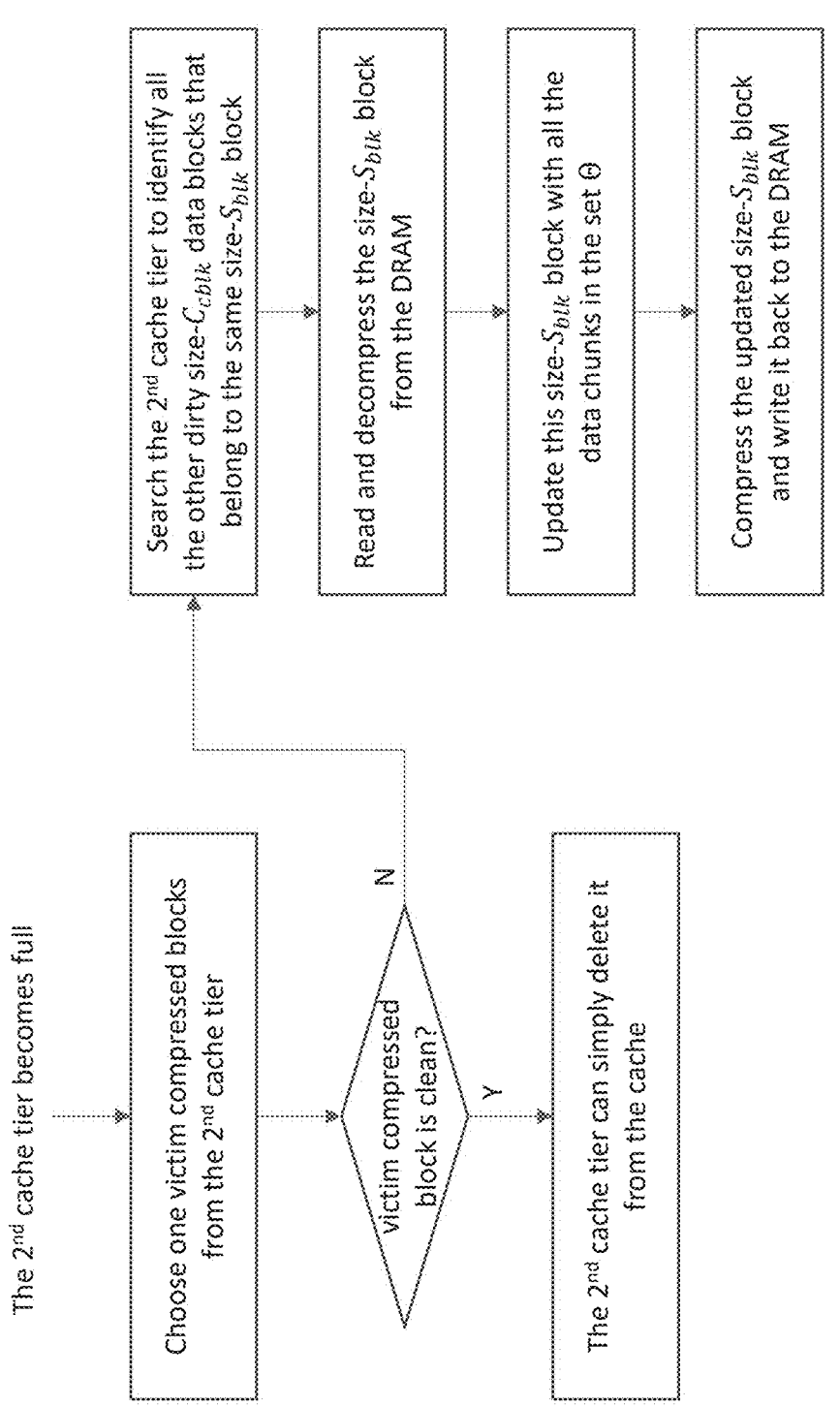
FIG. 11 illustrates the operational flow diagram of the generalized two-tier cache evicting a compressed block from the 2$^{nd}$ cache tier to DRAM according to embodiments.

As illustrated in FIG. 11, when the $2^{nd}$ cache tier 42 becomes full, chip 16 needs to evict one victim compressed block from the $2^{nd}$ cache tier 42. If the victim compressed block is clean (i.e., it has not been modified since it is loaded from DRAM), the $2^{nd}$ cache tier 42 can simply delete it from the cache. If the victim compressed block is dirty (i.e., it has been modified since it is loaded from DRAM), chip 16 searches the $2^{nd}$ cache tier 42 to identify all the other dirty size-$C_{cblk}$ data blocks that belong to the same size-$S_{blk}$ block. Let $\Theta$ denotes the set that contains these dirty size-$C_{cblk}$ data blocks. Chip 16 will read and decompress the size-$S_{blk}$ block from the DRAM, update this size-$S_{blk}$ block with all the data chunks in the set, and compress the updated size-$S_{blk}$ block and write it back to the DRAM.

It is understood that aspects of the present disclosure may be implemented in any manner, e.g., hardware, computer chips, as a software/firmware program, an integrated circuit board, a controller card, etc., that includes a processing core, I/O, memory and processing logic. Aspects may be implemented in a combination of hardware and software. Aspects of the processing logic may be implemented using field programmable gate arrays (FPGAs), application specific integrated circuit (ASIC) devices, and/or other hardware-oriented systems.

Aspects also may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on a host computer, partly on a host computer, on a remote computing device (e.g., a memory card) or entirely on the remote computing device. In the latter scenario, the remote computing device may be connected to the host computer through any type of interface or network. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to control electronic circuitry in order to perform aspects of the present disclosure.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A self-managed dynamic random-access memory (DRAM) module, comprising:
   a plurality of DRAM; and
   a controller chip having;
       a plurality of DRAM controllers for managing the plurality of DRAM independently of a central processing unit (CPU) chip;
       a CXL/PCIe input/output (I/O) engine for communicatively connecting the controller chip to the CPU chip via a CXL/PCIe channel; and
       a cache implemented independently from the CPU chip with a first tier configured for storing uncompressed data and a second tier configured for storing compressed data,
   wherein the controller chip is configured to handle data access requests received via the CXL/PCIe channel according to a process that includes:
       searching the first tier for an uncompressed cache data block to service the data access request;
       in response to a first tier hit, serving the uncompressed cache data block to service the data access request;
       in response to a first tier miss, searching the second tier for a compressed cache data block to service the data access request;
       in response to a second tier hit, decompressing the compressed cache data block to generate a decompressed cache data block, and inserting the decompressed cache data block into the first tier to service the data access request; and
       in response to a second tier miss, reading a compressed data block from DRAM, decompressing the compressed data block to generate a decompressed data block, and inserting the decompressed data block into the first tier to service the data access request.

2. The self-managed DRAM module of claim 1, wherein the first tier is implemented using a set-associative cache architecture.

3. The self-managed DRAM module of claim 2, wherein the second tier is implemented with a key-value data store architecture, wherein a key is a logical DRAM address and the compressed cache data block is identified with a value associated with the key.

4. The self-managed DRAM module of claim 1, wherein prior to inserting either the decompressed cache data block or the compressed data block in the first tier, determining whether the first tier is full.

5. The self-managed DRAM module of claim 4, wherein in response to a determination that the first tier is full, choosing an existing cache data block from the first tier, compressing the existing cache data block, and inserting the resulting compressed cache data block into the second tier.

6. The self-managed DRAM module of claim 5, wherein in response to a determination that the second tier is full, choosing an existing compressed cache data block from the second tier and determining whether the existing compressed cache data block has been modified since being loaded from DRAM.

7. The self-managed DRAM module of claim 6, wherein:
   in response to a determination that the existing compressed cache data block has not been modified since being loaded from DRAM, deleting the existing compressed cache data block; and
   in response to a determination that the existing compressed cache data block has been modified since being loaded from DRAM, writing the existing compressed cache data block to DRAM.

8. The self-managed DRAM module of claim 1, wherein a size of the cache data block is equal to a DRAM compressed block.

9. A method of handling data access requests with a self-managed dynamic random-access memory (DRAM) module, comprising:
   providing a plurality of DRAM;
   providing a controller chip having:
       a plurality of DRAM controllers for managing the plurality of DRAM independently of a central processing unit (CPU) chip;
       a CXL/PCIe input/output (I/O) engine for connecting the controller chip to the CPU chip via a CXL/PCIe channel; and
       a cache implemented independently from the CPU chip with a first tier configured for storing uncompressed data and a second tier configured for storing compressed data;
   searching the first tier for an uncompressed cache data block to service a data access request received via the CXL/PCIe channel;
   in response to a first tier hit, serving the uncompressed cache data block to service the data access request;
   in response to a first tier miss, searching the second tier for a compressed cache data block to service the data access request;
   in response to a second tier hit, decompressing the compressed cache data block to generate a decompressed cache data block, and inserting the decompressed cache data block into the first tier to service the data access request; and in response to a second tier miss, reading a compressed data block from DRAM, decompressing the compressed data block to generate a decompressed data block, and inserting the decompressed data block into the first tier to service the data access request.

10. The method of claim 9, wherein the first tier is implemented using a set-associative cache architecture and the second tier is implemented with a key-value data store architecture, wherein a key is a logical DRAM address and the compressed cache data block is identified from a value associated with the key.

11. The method of claim 9, wherein prior to inserting either the decompressed cache data block or the compressed data block in the first tier, determining whether the first tier is full.

12. The method of claim 11, wherein in response to a determination that the first tier is full, choosing an existing cache data block from the first tier, compressing the existing cache data block, and inserting the resulting compressed cache data block into the second tier.

13. The method of claim 12, wherein in response to a determination that the second tier is full, choosing an existing compressed cache data block from the second tier and determining whether the existing compressed cache data block has been modified since being loaded from DRAM.

14. The method of claim 13, wherein:
in response to a determination that the existing compressed cache data block has not been modified since being loaded from DRAM, deleting the existing compressed cache data block; and
in response to a determination that the existing compressed cache data block has been modified since being loaded from DRAM, writing the existing compressed cache data block to DRAM.

15. The method of claim 9, wherein a size of the cache data block is equal to a DRAM compressed block.

16. A self-managed dynamic random-access memory (DRAM) module, comprising:
a plurality of DRAM; and
a controller chip having:
a plurality of DRAM controllers for managing the plurality of DRAM independently of a central processing unit (CPU) chip;
a CXL/PCIe input/output (I/O) engine for communicatively connecting the controller chip to the CPU chip via a CXL/PCIe channel; and
a cache implemented independently from the CPU chip with a first tier configured for storing uncompressed data and a second tier configured for storing compressed data, wherein a first tier cache data block size is configured to be smaller than a DRAM compressed data block size and wherein a second tier compressed cache data block size is configured to be smaller than the DRAM compressed data block size and equal or larger than the first tier cache data block size, and wherein the controller chip is configured to handle data access requests received via the CXL/PCIe channel according to a process that includes:
searching the first tier for an uncompressed cache data block to service the data access request;
in response to a first tier hit, serving the uncompressed cache data block to service the data access request;
in response to a first tier miss, searching the second tier for a compressed cache data block to service the data access request;
in response to a second tier hit, decompressing the compressed cache data block to generate a plurality of decompressed data chunks, choosing a subset of the decompressed data chunks covering the data access request and inserting the subset of decompressed data chunks into the first tier to service the data access request; and
in response to a second tier miss, reading a compressed data block from DRAM, decompressing the compressed data block to generate a decompressed data block, and inserting a set of data chunks from the decompressed data block into the first tier to service the data access request.

17. The self-managed DRAM module of claim 16, further comprising:
choosing and compressing a chosen data block covering the requesting data to generates a compressed chosen data block; and
inserting the compressed chosen data block into the second tier.

18. The self-managed DRAM module of claim 16, wherein the first tier is implemented using a set-associative cache architecture and the second tier is implemented with a key-value data store architecture, wherein a key is a logical DRAM address and the compressed cache data block is determined from a value associated with the key.

19. The self-managed DRAM module of claim 16, wherein prior to inserting either the subset of decompressed data chunks or the set data chunks into the first tier, determining whether the first tier is full.

20. The self-managed DRAM module of claim 19, wherein in response to a determination that the first tier is full, choosing at least one existing cache data block from the first tier to evict, compressing the at least one existing cache data block, and inserting at least one existing compressed cache data block into the second tier.

* * * * *